Aug. 25, 1936.　　　F. J. WINGARD　　　2,052,154
DEVICE FOR TRIMMING THE EDGE OF A LAWN
Filed April 24, 1936
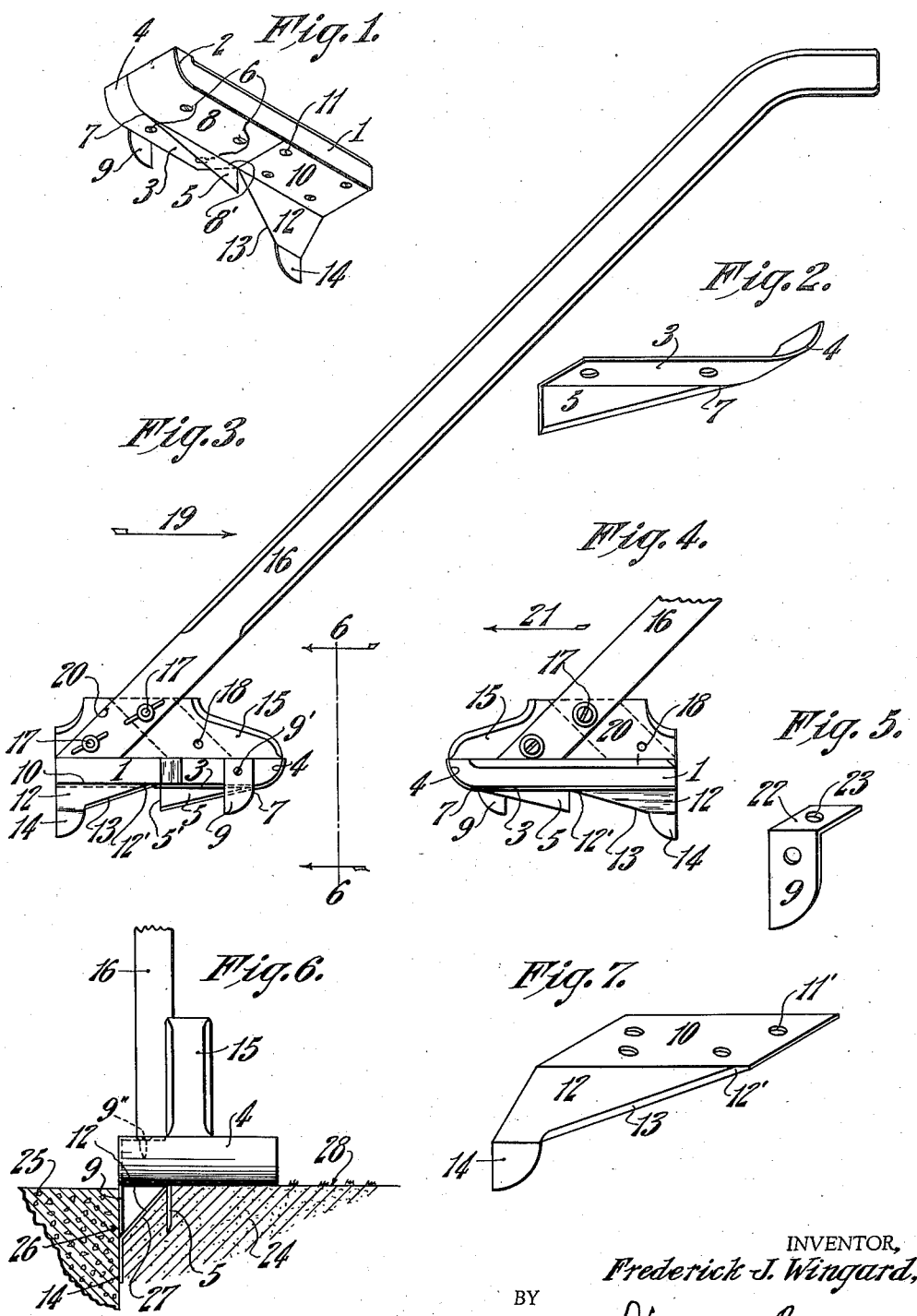
INVENTOR,
Frederick J. Wingard,
BY
Harry W. Bowen.
ATTORNEY.

Patented Aug. 25, 1936

2,052,154

UNITED STATES PATENT OFFICE 2,052,154

DEVICE FOR TRIMMING THE EDGE OF A LAWN

Frederick J. Wingard, Springfield, Mass.

Application April 24, 1936, Serial No. 76,154

5 Claims. (Cl. 97—227)

This invention relates to improvements in devices for trimming the edge of a lawn and one that is particularly adapted for trimming the edge of the lawn along the side of a concrete, asphalt, or similar sidewalk.

An object of the invention is to accurately trim the edge of the turf and sever the roots adjacent to the sidewalk and on a suitable angle, with relation to the sidewalk.

A further object of the invention is to provide an edge trimmer that may be operated in opposite directions, that is to say, it is designed to be pushed away from the operator, or drawn towards him, by merely reversing the direction of the detachable handle. In many places, where there is not enough space for the handle of an edge trimmer to be used when it is close to the wall of the building, it is impossible to use the tool the full length of a sidewalk; therefore, the handle is moved reversible for this purpose.

Broadly, the invention comprises a block member, the bottom face of which is protected with metal plates. Associated with these plates are two turf cutter blades of different lengths and two guiding blades, laterally spaced from the cutter blades, that are designed to engage the vertical edge of a concrete walk, while the metal cutting plates are being moved, on the turf. One of the cutting plates is formed on an incline, or angle, for producing an inclined, finished edge of the turf, when the cutting operations are completed.

Referring to the drawing, which forms a part of the specification:

Fig. 1 is a perspective view, showing the underside of the trimmer, and illustrating the two cutter blades, and guide plates.

Fig. 2 is a detail perspective view of one of the triangular-shaped cutters, which is formed as a part of one of the base plates.

Fig. 3 is a view, showing the edge trimmer when in use and is drawn towards the operator.

Fig. 4 is a view with the handle reversed for pushing the trimmer away from the operator.

Fig. 5 is a detail view of one of the guide plates removed from the device.

Fig. 6 is a view looking in the direction of the line 6—6 of Fig. 3, showing a portion of the turf and sidewalk in section and illustrating the trimming operation, and Fig. 7 is a detail perspective view of the other cutter forming a part of the base plate and having the integral guide plate and the cutting edge disposed at an angle to the base plate.

Referring to the drawing in detail:—

1 designates a block member, preferably of wood for lightness, having the curved, advancing front end portion, in order to make it easy to operate. Secured to the bottom of the block 1 is a metal plate 3, having a curved end 4, which engages the curved end 2 of the block 1. Integral with the inner side of this plate is a cutter 5, which is triangular in shape in side view, with the apex 7 adjacent the curved part 4. The plate 3 is secured to the block 1, by means of the screws 6, as shown in Fig. 1. Located on the block 1 at the side of the plate 3, is the metal plate 8, adjacent the cutter 5. 9 designates a depending member, shown in Fig. 5 that is secured to the block 1 at 9' and 9". The pointed end 8' of this plate is in line with the rear end of the plate 3. Located in the rear of the plate 3 is the plate 10, secured to the block 1, with the screws 11 in the holes 11'. This plate is shown removed in the perspective in Fig. 7. It is formed with the blade portion 12 that is inclined or set at an angle to the plate 10. It has a sharp cutting edge, indicated at 13, and a depending guide blade member 14.

It will be noticed, from Fig. 3, that the angular-shaped member, shown in Fig. 5, is secured to the block 1, at the outer side edge of the metal plate 8, and the guide blade portion 9 is in line with the blade 14 of the plate 10 of the cutter 12, but the guide blade 14 is longer, or lower, than the blade 9, as shown in Fig. 6.

15 designates an upright part that is secured to the upper side of the block 1 at right angles to the same, as shown in end view in Fig. 6. The part 15 is preferably of wood and is formed, on each of its opposite faces, with an inclined groove for attaching the operating handle 16, by means of bolts and thumb nuts 17 in the openings 18.

Referring to Fig. 3, the arrow 19 indicates that the operator is pulling, or drawing, the edge trimmer toward him, when the handle 16 is located in the inclined groove 20 on one side of the upright member, or part 15, and, is pushing it away from himself, as indicated by the arrow 21, in Fig. 4, when the handle 16 is secured in the inclined groove on the opposite side of the upright member 15. The member, shown in Fig. 5, is formed with the right angular part 22 for attaching the guide blade 9 to the block 1 by means of the screws 9" in the opening 23.

Referring to Fig. 6, the turf, or grass part to be trimmed, is indicated at 24, and the concrete sidewalk at 25. The operation of the trimmer is as follows: The implement is placed with the bottom plates 3 and 10 engaging the turf 24. When the trimmer is drawn toward the operator, the two guide blades 9 and 14 are placed against the side 26 of the concrete walk. In operation, the inclined blade 5 cuts the turf down to the depth of the part 5' of the blade. Next, the inclined cutter blade 12, which is arranged at an angle, follows behind the blade 5 with its front end 12', continues to cut the turf, where the end 5' leaves off. The inclined blade 12 then cuts the turf at an angle, as shown in Fig. 6, at 27. The guide blades 9 and 14, being of different lengths, serve to always engage the sides 26 of the concrete walk 25, without regard to the uneven upper surface 28 of the turf, or in other words, should the front guide blade 9 fail to engage the side 26, then the blade 14, which is longer, would still remain in contact.

Referring to Fig. 4, in which the edge trimmer is pushed, instead of pulled, the curved edge of the block 1 would also be forced along on the turf 24 and the cutters 5 and 12 would operate in the same manner. The advancing blade 5 serves to cut through the severed turf and roots at one side, when the trimmer is operated, then, the inclined blade completes the inclined and finished surface 27.

From this description, it will be seen, that I have provided an edge trimmer that is designed to trim the edge of the turf on an incline and at the same time, cut the roots of the grass by means of the advancing blade 5 and the following inclined blade 13 will produce the inclined cut. Also, I have provided an edge trimmer that may be operated in opposite directions, depending upon the condition and location of the edge to be trimmed.

What I claim is:—

1. An edge trimmer, comprising, a block member formed with a curve at one end, a pair of cutter elements secured to the bottom of the block member, the said cutters being triangular in side elevation, and one cutter being arranged at right angles to the plane of the bottom and the other at an obtuse angle to the plane of the bottom, means on the block member independent of the cutter elements for guiding the edge trimmer relative to the edge of the turf, comprising plates engageable with the vertical side of a concrete pavement, or the like, and reversible means for operating the trimmer in opposite directions.

2. An edge trimmer, comprising, a block member formed with a curve at one end, a pair of cutter elements secured to the bottom of the block member, the said cutters being triangular in side elevation, and one cutter being arranged at right angles to the plane of the bottom member and the other at an obtuse angle to the plane of the bottom member, means on the block member for guiding the edge trimmer relative to the edge of the turf, comprising plates engageable with the vertical side of a concrete pavement or the like, and means for operating the trimmer, the block member having a part secured thereto and having inclined grooves on its opposite faces for attaching the operating handle, whereby the trimmer may be pushed or pulled by the operator, as described.

3. An edge trimmer comprising a block member formed with a curved advancing end portion, a cutter triangular in side elevation the apex of which is located at the lower edge of the curve of the block, a guide plate laterally spaced from the cutter at the apex part of the same, a second cutter having a cutting edge located at an angle to the plane of the first-mentioned cutter and terminating in a guiding plate portion that is located in the plane of the first-mentioned guide plate, but the length of this blade is at a greater distance from the bottom of the block member than the first-mentioned guide blade, and the means for operating the edge trimmer.

4. An edge trimmer comprising, a block member, a plurality of cutters directly secured to the same, the cutters being arranged in spaced relation in a longitudinal direction, one of the cutters being located in a plane at right angles to the bottom surface of the block member, and the other cutter being located in a plane at an angle to the bottom surface of the block member and extending from a point where the first cutter terminates to the end of the block member, separate means engaging the edge of a sidewalk when the block member is located on the turf for laterally positioning the edge trimmer, relative to the turf to be trimmed.

5. As an article of manufacture, for the purpose described, a flat plate member, a cutting blade arranged at an angle to the flat plate member connected thereto and formed with a cutting edge, and a guide plate connected to and located at the end of the cutting blade and in a plane that is at right angles to the flat plate member.

FREDERICK J. WINGARD.